US008238462B2

(12) United States Patent
Jiang et al.

(10) Patent No.: US 8,238,462 B2
(45) Date of Patent: Aug. 7, 2012

(54) RESOURCE ALLOCATION METHOD FOR MIMO-OFDM OF MULTI-USER ACCESS SYSTEMS

(75) Inventors: Peigang Jiang, Shenzhen (CN); Mattias Wennstrom, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 1066 days.

(21) Appl. No.: 12/050,623

(22) Filed: Mar. 18, 2008

(65) Prior Publication Data

US 2008/0165883 A1  Jul. 10, 2008

Related U.S. Application Data

(63) Continuation of application No. PCT/CN2005/001625, filed on Sep. 30, 2005.

(51) Int. Cl.
*H04L 1/02* (2006.01)
(52) U.S. Cl. ........................................ 375/267
(58) Field of Classification Search .................. 375/260, 375/267, 295, 349, E01.032; 370/57, 69.1, 370/120, 277, 281, 295, 302, 330, 343, 436, 370/478, 480–481, 209, 334–335
See application file for complete search history.

(56) References Cited

U.S. PATENT DOCUMENTS

| 5,886,988 | A  | * | 3/1999  | Yun et al. ....................... 370/329 |
| 6,377,819 | B1 | * | 4/2002  | Gesbert et al. ............. 455/562.1 |
| 6,963,742 | B2 | * | 11/2005 | Boros et al. .................... 455/424 |
| 6,999,771 | B1 | * | 2/2006  | Kasapi et al. ................. 455/450 |
| 7,020,110 | B2 |   | 3/2006  | Walton et al. |
| 7,050,480 | B2 | * | 5/2006  | Ertel et al. ..................... 375/141 |
| 7,280,625 | B2 |   | 10/2007 | Ketchum et al. |
| 2002/0067759 | A1 | * | 6/2002 | Ertel et al. ..................... 375/141 |
| 2002/0141587 | A1 | * | 10/2002 | Ertel et al. ..................... 380/270 |
| 2003/0100324 | A1 | * | 5/2003 | Kasapi .......................... 455/504 |
| 2004/0063450 | A1 | * | 4/2004 | Uhlik ............................ 455/517 |
| 2004/0137906 | A1 |   | 7/2004 | Nakao et al. |
| 2006/0039312 | A1 |   | 2/2006 | Walton et al. |

(Continued)

FOREIGN PATENT DOCUMENTS

CN  1668035 A  9/2005

(Continued)

OTHER PUBLICATIONS

Zhang et al., An Efficient Resource-Allocation Scheme for Spatial Multi-User Access in MIMO/OFDM Systems, 2005, Communications, IEEE Transactions on, vol. 53, pp. 107-116.*

(Continued)

*Primary Examiner* — Lawrence B Williams
(74) *Attorney, Agent, or Firm* — Leydig, Voit & Mayer, Ltd.

(57) ABSTRACT

A resource allocation method for MIMO (multi-input multi-output-OFDM (orthogonal frequency-division multiplex) of multi-user access systems includes A) for each sub-carrier or group of sub-carriers of OFDM, grouping signature vectors of users at a time period according to correlations of the signature vectors; B) from the grouping results, selecting the signature vectors according to a scheduling rule; assigning the sub-carrier frequency and time resource to users of which simultaneously the selected signature vectors have low correlations; and assigning spatial resource to the users corresponding to the selected signature vectors. By minimizing the spatial co-channel interference to an acceptable low level, the complexity significantly in the joint multi-user optimization is reduced.

15 Claims, 3 Drawing Sheets

U.S. PATENT DOCUMENTS

2007/0297526 A1    12/2007    Ketchum et al.

FOREIGN PATENT DOCUMENTS

| EP | 1 434 452 A1 | 6/2004 |
|---|---|---|
| WO | WO 03/058871 A1 | 7/2003 |
| WO | WO 2004/054191 A1 | 7/2004 |
| WO | WO 2005/057838 A1 | 6/2005 |

OTHER PUBLICATIONS

Koutsopoulos et al., Adaptive Resource Allocation in SDMA -Based Wireless Broadband Networks with OFDM Signaling, 2002, INFOCOM 2002. Twenty-First Annual Joint Conference of the IEEE Computer and Communications Societies. Proceedings. IEEE, vol. 3, pp. 1376-1385.*

Zhang et al., An Efficient Resource-Allocation Scheme for Spatial Multiuser Access in MIMO/OFDM Systems, Jan. 2005, IEEE Transaction on Communications, vol. 53, No. 1, pp. 107-116.*

Bartolome et al., "Spatial Scheduling Algorithms for Wireless Systems," *IEEE International Conference on Acoustics, Speech and Signal Processing*, 4: IV_185-IV_188 (Apr. 2003).

Del Galdo et al., "Comparison of Zero-Forcing Methods for Downlink Spatial Multiplexing in Realistic Multi-User MIMO Channels," *Vehicular Technology Conference*, 1: 299-303 (May 2004).

Letaief et al., "An Efficient Resource-Allocation Scheme for Spatial Multiuser Access in MIMO/OFDM Systems," *IEEE Transactions on Communications*, 53(1): 107-116 (Jan. 2005).

State Intellectual Property Office of the People's Republic of China, Examination Report in Chinese Patent Application No. 200580050941.5 (Mar. 1, 2010).

State Intellectual Property Office of the People's Republic of China, English Translation of Written Opinion of the International Searching Authority in International Patent Application No. PCT/CN2005/001625 (Jul. 20, 2006).

European Patent Office, Examination Report in European Patent Application No. 05792221.3 (Sep. 11, 2009).

Samsung and Snu, Per Unitary Basis Stream User and Rate Control ($PU^2RC$), 3GPP TSG RAN WG 1 #32, TSGR1#32 R1-030576, Paris, France (May 19-23, 2003).

Huawei, "Initial Performance Evaluation of Multi-User MIMO Scheme," 3GPP TSG RAN WG1, R1-051094, San Diego, California, USA (Oct. 10-14, 2005).

MIMO AH Chair, "Text Proposal for Summarizing the LTE MIMO Discussion," 3GPP TSG RAN WG1 Meeting #43, R1-051604, Seoul, Korea (Nov. 7-11, 2003).

Samsung, "MIMO for Long Term Evolution," 3GPP TSG RAN WG1 Meeting #42 (Aug. 29-Sep. 2, 2005).

* cited by examiner

RESOURCE ALLOCATION METHOD FOR MIMO-OFDM OF MULTI-USER ACCESS SYSTEMS

CROSS-REFERENCE TO RELATED APPLICATIONS

This application is a continuation of International Patent Application No. PCT/CN2005/001625, filed Sep. 30, 2005, which is hereby incorporated by reference.

FIELD OF THE INVENTION

The invention relates to resource allocation in a multiuser wireless communications system with multiple antennas at both the serving base station and the receiving mobile station, and more specifically to a method for allocating resources in frequency, time, and space dimension with reduced complexity for joint multi-user optimization in MIMO (multiple-input multiple-output) systems with OFDM (orthogonal frequency-division multiplexing) signaling, i.e. MIMO-OFDM systems.

BACKGROUND OF THE INVENTION

In wireless MIMO communication systems, the use of multiple antennas is much preferred in order to increase the performance of the systems. When multiple antennas at the base station and mobile station are used, the space dimension may additionally be exploited for scheduling the transmission to different users in the systems.

It is well known that in the multi-user MIMO system, there exists parallel channels characterized by mutually orthogonal spatial signature vectors (SSVs) for each user, data pre-coded by these spatial signature vectors can be transmitted simultaneously without co-channel interference (CCI). If the spatial signature vectors of different users are mutually orthogonal, the data of the simultaneous users can be multiplexed in space domain. To improve the link performance of an MIMO system, knowledge of the MIMO channels should be utilized and pre-coding at the transmitter should be performed. A common well-known pre-coding method is to obtain the pre-coding vectors from the singular value decomposition (SVD) of the MIMO channel matrix. Each singular vector form the MIMO channel matrix, also known as a spatial signature vector, corresponds to a spatial data-stream. In accordance with this approach together with a water filling algorithm to distribute the transmit power among the data streams, the channel capacity for the point-to-point Gaussian channel of a single user is achieved.

An OFDM system allows for scheduling of data to users in the time-frequency domain. By using multiple antennas at the base station and the mobile station, users can be scheduled additionally in the spatial domain. When an OFDM time-frequency resource is reused in the spatial domain, this denotes that multiple data-streams are transmitted. Due to the non-orthogonality between spatial data-streams, the data transmitted in different spatial streams for a particular OFDM time-frequency resource, mutually interferes with each other, creating co-channel interference (CCI). Specifically, when transmitting to several users simultaneously in different spatial data-streams of a time-frequency resource in a MIMO-OFDM system, these different users also experience CCI between the multiple data-streams.

Therefore, in contrast to the time-frequency grid in OFDM, which gives orthogonal channels between different users, the further division of the available channels in the space dimension generates a set of channels that generally are not orthogonal to each other. So, for instance, if a time-frequency resource in an OFDM system is allocated to two users at the same time, the transmission to these users mutually interferes with each other due to the co-channel interference.

With the multi-user MIMO-OFDM system, the task of the scheduler is to assign OFDM time-frequency resources, as well as spatial resources to the served users in the coverage of the cell. This task can be overwhelming. The problem is that the optimal resource allocation problem in power, space, time and frequency dimensions has to be done jointly among all the users in the coverage of the cell, due to the non-orthogonality of the spatial dimension that couples the signal to interference ratio of the different users through the co-channel interference. If the MIMO channels hypothetically were orthogonal also in the spatial domain, the scheduler's task would be greatly simplified because it could treat the space, time and frequency domains as orthogonal resources to be allocated to the users.

The non-orthogonality in the spatial domain leads to an extremely complex optimization problem. For example, the paper entitled "MIMO for Long Term Evolution," which was presented in document R1-050889, 3GPP TSG RAN WG1 Meeting #42, London, UK, 29 Aug.-2 Sep. 2005, relates to a method for resource allocation. Based on unitary matrix pre-coding, data streams from different users are multiplexed in space and time domains. A set of unitary pre-coding matrices is defined off-line. Major steps in the above article are:

1. Each user feedbacks a preferred unitary pre-coding matrix whose column vectors are orthogonal spatial signature vectors. In addition, Channel Quality Information (CQI) for all the pre-coding vectors in the matrix is fed back to the base station;

2. The base station groups users who declare the same preferred unitary pre-coding matrix;

3. The base station selects a group according to a scheduling rule;

4. The base station allocates the orthogonal corresponding pre-coding vectors to users in this selected group according to a scheduling rule;

5. The base station pre-codes different users' data streams by the assigned pre-coding vectors and transmits the pre-coded data streams at the same frequency and time resource.

There are some drawbacks in this scheme:

1) The users are always asked to feedback all available spatial signature vectors and corresponding CQI information. In practice, usually only a few or one of the spatial signature vectors and a few or one of CQI information is necessary in the base station.

2) In this scheme, because users are first grouped according to the same pre-coding matrix, this means that only a subset of the users which select the same pre-coding matrix are possible to be multiplexed in space domain. Although this method can guarantee spatial signature vectors of multiplexed users to be strictly orthogonal, leading to low CCI, in practice, the group of users who can be spatially multiplexed are restricted. Because the probability that more than one user prefers the same pre-coding matrix, which also is a requirement for spatial multiplexing, may be low in some environment especially when the number of users in the cell coverage area is small, which brings out a serious limitation.

3) There exists such a case that users which prefer different pre-coding matrices and have mutually orthogonal space signature vectors can be multiplexed in space with low CCI, however in this scheme the space domain multi-user multiplexing opportunity is lost.

4) The scheme assumes that the selected pre-coding vectors are orthogonal. However, it is easily shown as follows, that this does not assure that the received signals are CCI free.

Assume two users with MIMO channel matrices $H_1$ and $H_2$ respectively. The data $x_1$ to user 1 with the pre-coding vector $w_1$ and the data $x_2$ to user 2 with the pre-coding vector $w_2$ are transmitted. The received signals for user 1 and 2 can then be expressed as $$y_1 = H_1(w_1 x_1 + w_2 x_2) + n_1$$

$$y_2 = H_2(w_1 x_1 + w_2 x_2) + n_2$$

where $n_1$ and $n_2$ are the respective noise vectors for the two users. The CCI for user 1 is given by the term $H_1 w_2 x_2$. In the scheme described above, it is assumed that pre-coding vectors are orthogonal, hence $w_1^* w_2 = 0$ is held. To remove the CCI for user 1 completely, it is necessary that $w_1$ is a singular vector to $H_1$ and to remove the CCI for user 2 completely, it is necessary that $w_2$ is a singular vector to $H_1$. Simultaneously $w_1^* w_2 = 0$ shall be hold. Hence, complete removal of CCI between two users is very unlikely because it requires a very special relation between the singular vectors of their MIMO channels $H_1$ and $H_2$.

Therefore, there is a problem in the above scheme in that it is premised on the requirement of orthogonal pre-coding vectors $w_i^* w_j = 0$, $i \neq j$, and such a condition that in reality has low significance because CCI in all practical MIMO channels is non-zero anyway.

To increase the opportunities of multiplexing users, especially when there are a low number of MIMO users in the cell coverage area, to obtain an increase in the multi-user diversity gain, the CCI between users multiplexed in space to be larger than zero is allowed. In other words, if the CCI between users multiplexed in space dimension is allowed to be larger than zero, the opportunity of multiplexing users increases and more diversity gain may be obtained in space domain. Thus both more diversity gain obtained in space domain and low CCI exists conflict and the scheme has no ability to solve the conflict between CCI and multi-users diversity gain or to compromise it.

Another scheme is exemplified by an article entitled "An Efficient Resource-Allocation Scheme for Spatial Multi-user Access in MIMO/OFDM Systems," which is published in IEEE Transactions on Communications, Vol. 53, No. 1, 1, 2005. This article discloses that radio resources are exploited in frequency, time and space domains. Users are grouped according to user's mutual correlations which respectively depend on the maximal SSV selected from spatial signature vectors of each user. The scheduler is to assign the radio resources with the same frequency and time to different users if correlations between any pair of users from different groups are sufficient low, i.e. the users are orthogonal in space domain.

However, the resources allocation scheme is suitable for uplink and only the space mode with maximum gain is considered for each user. In practical wireless communication environments, the grouping criterion may not always be fulfilled. Furthermore, the amount of required feedback signaling is large.

SUMMARY OF THE INVENTION

This invention presents a method for allocating resources in frequency, time, and space dimensions to reduce the complexity significantly in the joint multi-user optimization.

To achieve the object, a resource allocation method for multi-input multi-output (MIMO)-orthogonal frequency-division multiplex (OFDM) of multi-user access systems, includes:

A) for each sub-carrier or group of sub-carriers of OFDM, grouping signature vectors of users at a time period according to correlations of the signature vectors;

B) from the grouping results, selecting the signature vectors according to a scheduling rule;

assigning the sub-carrier frequency and time resources to users of which simultaneously the selected signature vectors have low correlations; and assigning spatial resource to the users corresponding to the selected signature vectors.

Instead of grouping users having all the same SSVs as in the first article, the SSVs of each user are independently grouped with other user's SSVs. That means multiplexed users need not have the same preferred pre-coding matrix as in the first article, also the grouping is controlled by a parameter of SSV correlation which determines the CCI. Choosing different parameters, different compromising results between CCI and multiplexing opportunity in space domain can be obtained. The throughput and Quality of Services (QoS) of the system can be enhanced by optimizing the parameter. Instead of grouping users as in the second article, it is easy to guarantee orthogonality of the spatial dimension with users' SSVs by directly grouping users' SSVs in the invention. Thus, by minimizing the spatial co-channel interference to an acceptable low level, the complexity significantly in the joint multi-user optimization is reduced.

Different from the first and second articles identified above, the number of SSVs fed back from each user is adaptive and individual for each user depending on the particular user's channel condition such as channel rank.

In summary, effects of this invention could be described as:

The invention improves over the prior schemes as exemplified by the articles described above by firstly removing the pre-coding matrix design criterion that pre-coding vectors are orthogonal, thereby, a better match between pre-coding vectors and channel singular vectors.

Secondly, the grouping in the spatial domain is performed among the users by individually selecting (i.e. not group selecting) preferred pre-coding vectors instead of what is done between users in prior schemes.

Thirdly, the flexibility is further increased by allowing an adaptive number of pre-coding vectors that are fed back according to the users channel conditions.

Fourthly, a feedback method is described which allows the grouping to be made off-line, prior to real time operation. These improvements described in this disclosure provide a time-frequency-space resource allocation scheduler in a MIMO/OFDM system.

EMBODIMENTS OF THE INVENTION

The present invention is described in detail in conjunction with the accompanying drawings. A resource allocation for downlink from the base station to users is taken as an embodiment.

The SSVs and the spatial sub-channel gains, SSGs, for each OFDM time-frequency resource from the multiple users are received by a base station. In the base station, these SSVs are grouped in several groups where the SSVs within a group have high spatial correlation and SSVs from different groups have low spatial correlation, or the SSVs within a group have low spatial correlation and SSVs from different groups have high spatial correlation. The groups are defined by specifying a spatial correlation threshold parameter.

Based on the first grouping rule where the SSVs within a group have high spatial correlation and SSVs from different groups have low spatial correlation, the base station selects one SSV and corresponding user from each group according to a scheduling rule. Data streams from selected users are pre-coded by associated SSV and transmitted. Based on the second grouping rule where the SSVs within a group have low spatial correlation and SSVs from different groups have high spatial correlation, the base station selects one group according to a scheduling criterion. Data streams are pre-coded by SSVs in this group and transmitted.

To reduce feedback load, each user selects its SSV from a pre-determined set of SSVs and feeds back only the indices of the table with pre-determined set of SSVs and the corresponding SSGs. The table is stored in both the base station and the users. This reduces the feedback load considerably. Because there is a predetermined set of SSVs, the grouping of SSVs in the first part of the invention can be made off-line. Hence, when an SSV index is received from a user, it may be directly categorized in one of the pre-determined groups. This reduces the complexity of the present invention considerably.

With this separation of the SSVs in groups, the complexity of the optimisation in the joint space-time-frequency resource allocation is reduced because the CCI in the space domain is below a pre-determined value and the space-time-frequency resources may be considered close to orthogonal, so that the CCI entanglement in the joint multi-user optimisation is decoupled.

Figure 1:
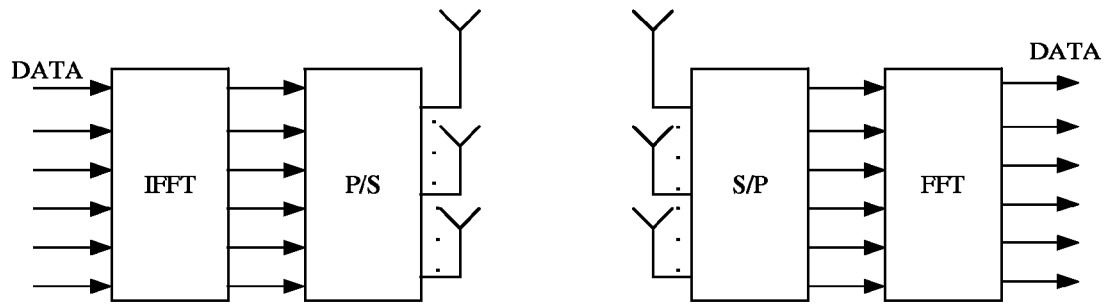
FIG. 1 shows a transmitting and receiving structure of MIMO-OFDM system.

A multi-user access MIMO-OFDM system such as illustrated in FIG. 1 is modeled as follows:

$$y_k^l(t) = H_k^l(t)x(t) + n_k^l(t), k=1,\ldots,K; l=1,\ldots,L, \quad (1)$$

where $H_k^l(t) \in C^{m \times n}$ is wireless channel coefficient matrix from the base station to kth user corresponding to lth sub-carrier at sampled time t, $y_k^l(t) \in C^m$ is the received vector of kth user on lth sub-carrier at sampled time t, $x(t) \in C^n$ is the transmitted symbol vector satisfying average power constraint $E_t\{x^H(t)x(t)\} \leq P$, $n_k^l(t) \in C^m$ is the corresponding additive channel noise. Because the resources are orthogonal in time-frequency domain, in the following the time index t and frequency superscript l without confusion are omitted.

Any matrix, especially the channel coefficient matrix for each user k can be decomposed by SVD as follows:

$$H_k = U_k D_k V_k^H \quad (2)$$

where $$U_k = [u_{k,1} \; u_{k,2} \; \ldots \; u_{k,m}] \in C^{m \times m}$$

$$V_k = [v_{k,1} \; v_{k,2} \; \ldots \; v_{k,n}] \in C^{n \times n}$$

are unitary matrices and $D \in C^{m \times n}$ is a diagonal matrix. If $rank(H_k) = \omega_k$, the SVD of the MIMO channel matrix provides $\omega_k$ parallel (no mutual interference) sub-channels from the transmitter to the receiver. The elements being equal to non-zero in matrix D are the SSGs, and the column vectors of $V_k$ can be regarded as the SSV of each sub-channel. Data streams of kth user weighted by these SSVs can be detected by the receiver without self-interference from other SSVs from the same SVD.

When considering multi-user access system, if the spatial signature vectors corresponding to different users are orthogonal, these users can transmit data streams in the same sub-carrier without CCI. For example, if $v_{i,1}^H v_{j,1} = 0$, the CCI free transmit vector can be constructed as:

$$x = \sqrt{P_{1,i}} v_{i,1} x_i + \sqrt{P_{1,j}} v_{j,1} x_j$$

where $x_i$ is the data streams of user i, $x_j$ is the data streams of user j and $P_{1,j}$ is the allocated power of stream 1 of user j. In practice, the equation $v_{i,1}^H v_{j,1} = 0$ is highly unlikely, so the CCI of users transmitting data streams in the same sub-carrier l and at the same time index t (same time-frequency resource), can be controlled by the correlation coefficient of the spatial signature vectors used to weight the data streams.

Figure 2:
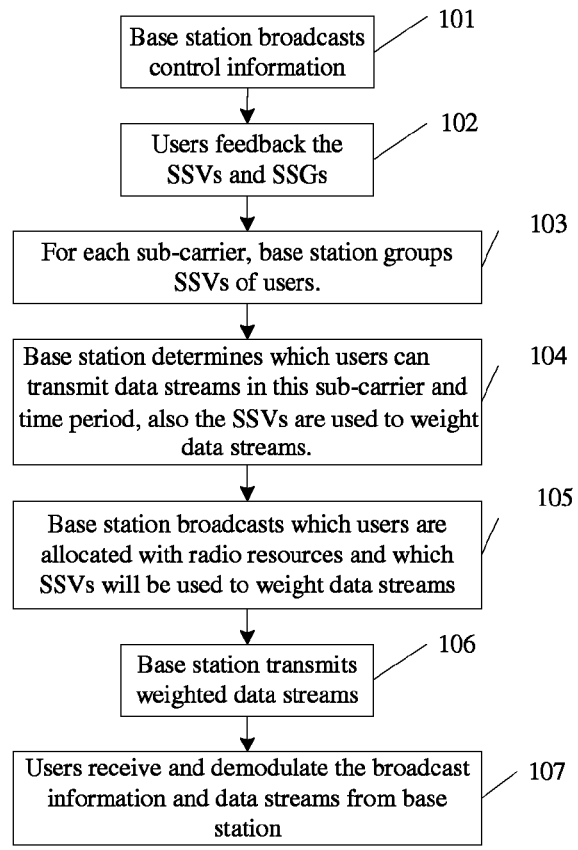
FIG. 2 shows the flowchart of the radio resources allocation method.

FIG. 2 shows the steps of the radio resources allocation method. The method includes:

Step 101: For each sub-carrier/or group of sub-carriers and time period t, a base station transmits control information about which users are allowed to transmit data in the time-frequency resources. Preferably in order to decrease channel resource, the control information may be broadcasted to the users. The base station may also broadcast the maximum number of data streams multiplexed in space for each user, for instance, the maximum number is denoted $r_k$ for user k. $r_k$ may be smaller than rank($H_k$) and may be changed adaptively according to the users changing channel condition and the traffic load in the system. In this way, flexibility is improved.

Step 102: The users feedback their spatial signature vectors $v_{k,1}^l v_{k,2}^l \ldots v_{k,r_k}^l$ and the corresponding spatial sub-channel gains $\lambda_{k,1}^l \lambda_{k,1}^l \ldots \lambda_{k,r_k}^l$ to the base station by uplink channel.

Step 103: After having received the SSVs and corresponding SSGs, the base station groups the SSVs for each sub-channel l according to a pre-determined threshold ρ. The detailed grouping steps will be described hereafter. The grouping results can be expressed as:

$$G_1^l = \{v_{k_{G_1,1},s_1}^l, v_{k_{G_1,2},s_2}^l, \ldots \}$$

$$G_2^l = \{v_{k_{G_2,1},s_1}^l, v_{k_{G_2,2},s_2}^l, \ldots \}$$

$$\ldots$$

$$G_g^l = \{v_{k_{G_g,1},s_1}^l, v_{k_{G_g,2},s_2}^l, \ldots \}$$

where $G_g^l$ represents $g^{th}$ grouping results for sub-channel l.

Step 104: The base station allocates the spatial, frequency and time resources to the users according to the grouping results. Namely, the base station determines which users can transmit data streams in sub-carrier l and time period t, and which SSVs can be used to weight data streams. Different grouping rules lead to different allocation modes.

Step 105: The base station broadcasts the resource allocation results to the users. Also optionally, for enhancing the users' demodulation performance, the SSVs of each data stream can be broadcasted to all users.

Step 106: The base station transmits weighted data streams to corresponding user.

Step 107: The users receive and demodulate the control information and data streams from the base station.

Figure 3:
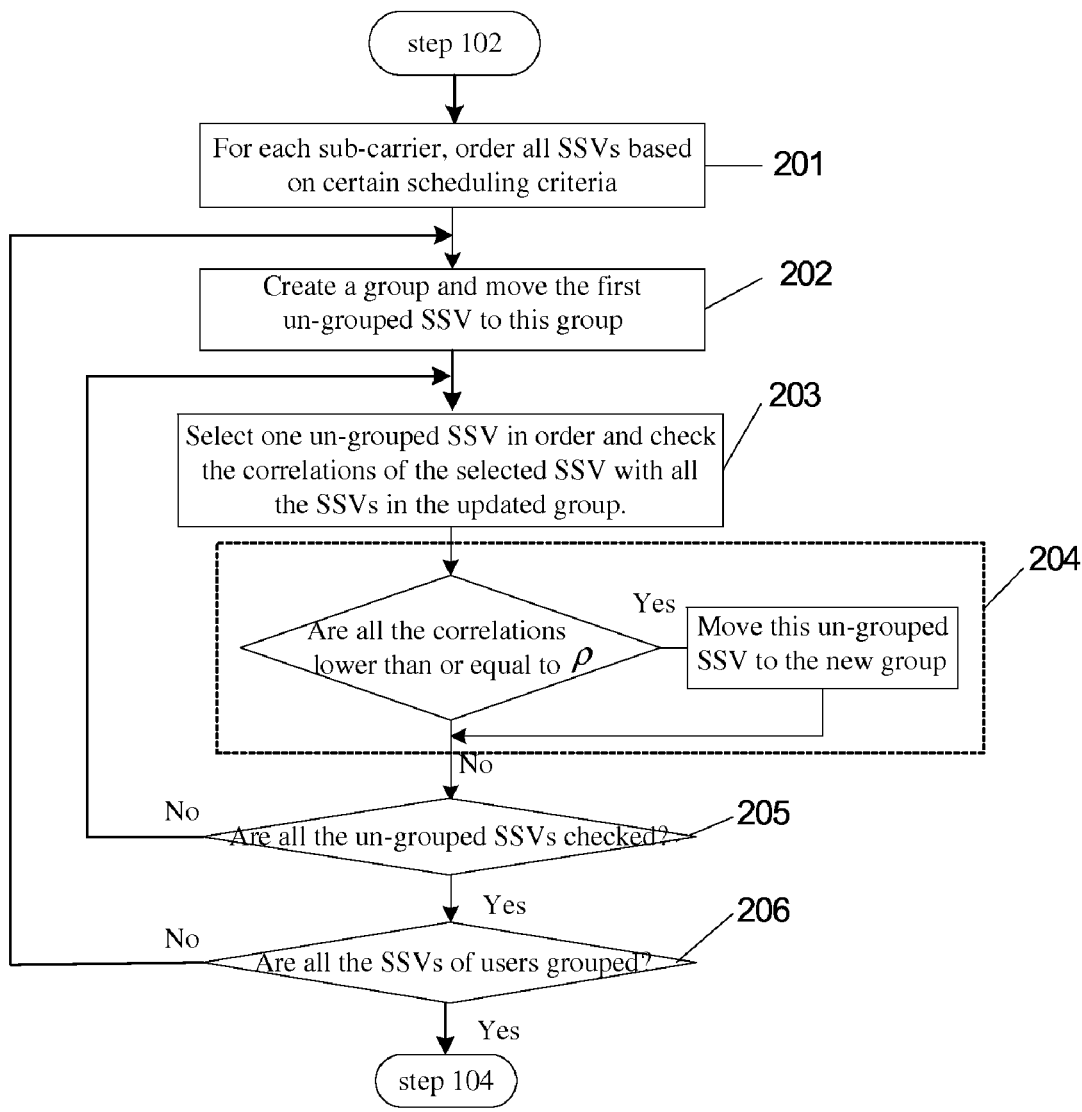
FIG. 3 shows the grouping steps according to a rule of un-correlation within group.
Figure 4:
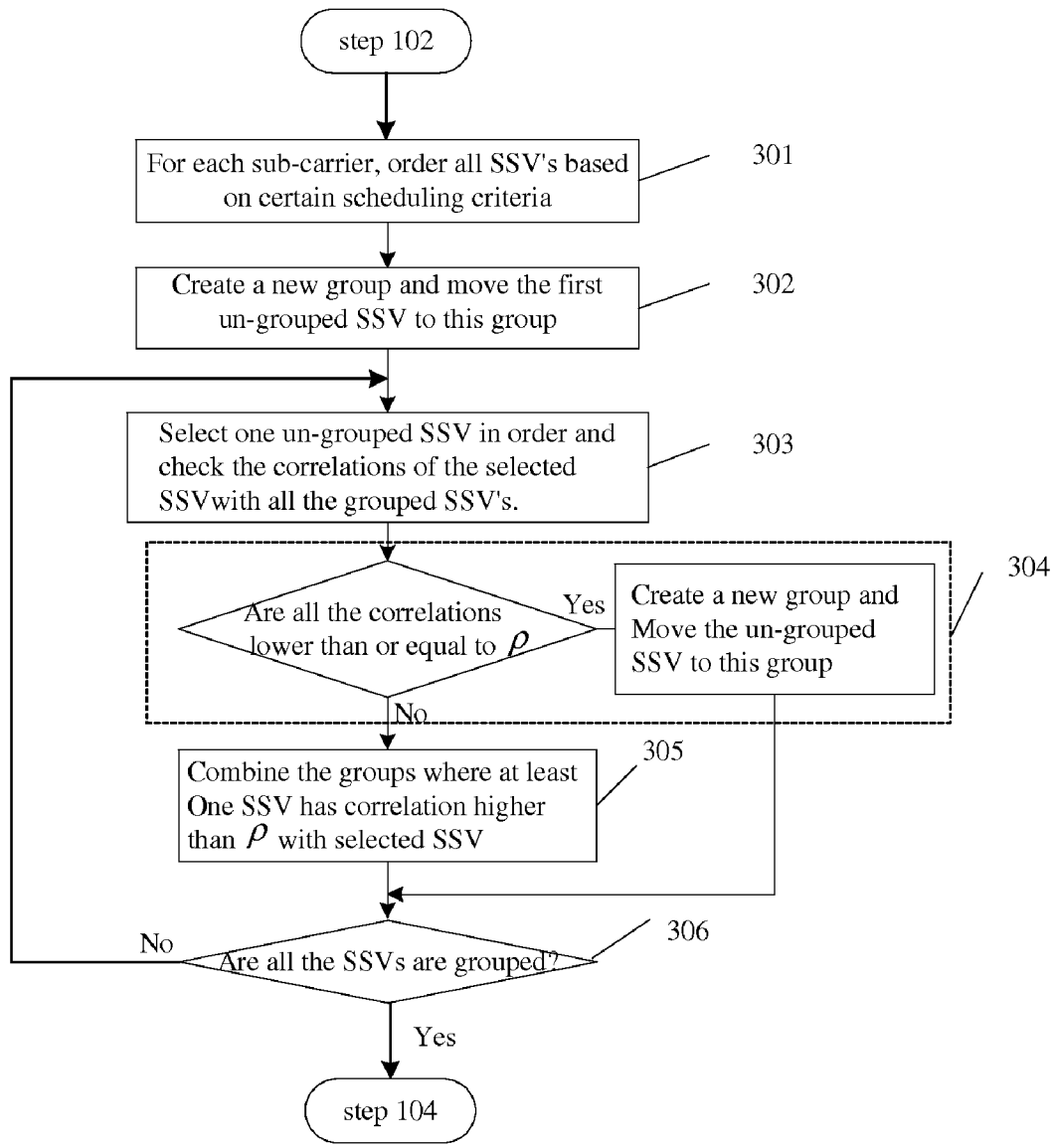
FIG. 4 shows the grouping steps according to a rule of un-correlation between groups.

There may be two different grouping methods which are shown in FIGS. 3 and 4, respectively, used in step 103. FIG. 3 shows the grouping steps according to un-correlation within group rule (UWGR). By UWGR, the grouping is such that the correlations of SSVs within the same group are lower than or equal to the pre-determined threshold ρ.

The grouping based on UWGR can be implemented at the base station by the following steps:

Step 201: Order the SSVs usually according to a scheduling criterion.

Step 202: For each sub sub-carrier l or group of sub-carriers, create a new group $G_g^l$ and move the first un-grouped SSV to this group.

Step 203: Select one un-grouped SSV in order and check the correlations of the selected SSV with all the SSVs in the group.

Step 204: If all the checked correlations are lower than or equal to the pre-determined threshold ρ, move this un-grouped SSV to the new group; otherwise, go to Step 205.

Step 205: Judge whether all the un-grouped SSVs are checked, if yes, go to step 206; otherwise, return to step 203.

Step 206: Judge whether all the received SSVs are grouped, if one of the received SSVs are not grouped, return to step 202; otherwise, to step 104.

Based on the grouping results by UWGR, step 104 is implemented as following: selecting one group according to a scheduling rule, and allocating the frequency and time resources to at least one user whose SSVs are included in this selected group; weighting the data streams of selected user by the corresponding SSV in this group. In this way, the users are orthogonal in space domain so as to decouple CCI.

FIG. 4 shows the grouping steps according to un-correlation between groups rule (UBGR). By UBGR, the grouping is such that the correlations of SSVs belonging to different groups are lower than or equal to the pre-determined threshold ρ. The grouping based on UBGR may be implemented at the base station by the following steps:

Step 301: Similar to step 201, order the SSVs according to the scheduling criterion.

Step 302: For each sub-carrier l or group of sub-carriers, creating a group $G_g^l$ and moving the first un-grouped SSV to this group.

Step 303: Select one un-grouped SSV in order and check the correlations of the selected SSV with all the SSVs in the group.

Step 304: If all the checked correlations are lower than or equal to the pre-determined threshold ρ, create a new group and moving this un-grouped SSV to the this group; otherwise, go to Step 305.

Step 305: Combine the groups where at least one SSV has correlation higher than the pre-determined threshold ρ with the selected SSV.

Step 306: Judging whether all the received SSVs are grouped, if one of the received SSVs are not grouped, return to step 303; otherwise, to step 104.

Based on the grouping results by UBGR, step 104 is implemented as following: selecting one SSV in each group according to a scheduling rule, determining corresponding users according to the selected SSVs so that the corresponding users are selected indirectly, allocating with the frequency and time resources; weighting data streams of the selected user by the corresponding SSV in each group. In this way, the users are orthogonal in space domain so as to decouple CCI.

The groupings given in FIG. 3 and FIG. 4 are implemented in real time according to users' feedback information, which need a lot of calculation resources of the base station. A practical implementation procedure with less complexity of the method is described as following. First, to reduce the amount of feedback signaling of the SSVs, for each set of n transmitter antennas and m receiver antennas, there is a pre-determined set of $M_{n,m}$ SSVs hereafter called generic SSVs, denoted $S_{n,m} = \{w_1^{(n,m)}\ w_2^{(n,m)} \ldots w_{M_{n,m}}^{(n,m)}\}$. These sets of generic SSVs are predetermined in the system and known to both the receiver and the transmitter. When a user wants to feed back an SSV, it searches for the closest generic SSV in the set $S_{n,m}$ and determines a corresponding index, where "closeness" can be defined in various ways according to the theory of vector quantization.

Instead of feeding back the whole SSV, the user feeds back the SSV index to the "closest" vector $w_c^{(n,m)}$ and $S_{n,m}$. Hence, only $\lceil \log_2(M_{n,m}) \rceil$ bits are needed for this feedback.

Because by a quantization method all possible SSVs that can be feed back from the users in the systems are fixed and known in advance, the grouping of the predetermined SSVs can also be made in advance to obtain a generic group. Hence, the generic groups can be formed as:

$$\tilde{G}_1 = \{w_{s_1}^{(n_1,m_1)}, w_{s_2}^{(n_2,m_2)}, \ldots\}$$

$$\tilde{G}_2 = \{w_{s_q}^{(n_q,m_q)}, w_{s_{q+1}}^{(n_{q+1},m_{q+1})}, \ldots\}$$

$$\ldots$$

$$\tilde{G}_g = \{w_{s_a}^{(n_a,m_a)}, w_{s_{a+1}}^{(n_{a+1},m_{a+1})}, \ldots\}$$

such that correlations of generic SSVs within each group are lower than or equal to ρ by UWGR. Or alternatively, the correlations of vectors belongs to different groups are lower than or equal to ρ by UBGR. These generic groups are independent of user index k and sub-band index l.

When the base station receives an SSV index from a user, it may assign SSV corresponding to the index to one of the generic groups without the need for any spatial correlation calculations, thereby grouping results can be obtained with reducing the complexity considerably.

Although illustrative embodiments of the disclosure have been shown and described, other modifications, changes, and substitutions are intended in the above disclosure. For example, other signature vectors used to characterize spatial resource also can be grouped, or the method of invention is used in uplink.

The invention claimed is:

1. A resource allocation method used in a multi-input, multi-output-orthogonal frequency division multiplex (MIMO-OFDM) system comprising the steps of:
   receiving, by a base station, signature vectors fed back from users;
   for each sub-carrier or group of sub-carriers of the MIMO-OFDM system, grouping the signature vectors of the users at a time period according to correlations of the signature vectors;
   from the grouping results, selecting signature vectors having low correlations; assigning the sub-carrier or group of sub-carriers at a time period to the users corresponding to the selected signature vectors; and
   assigning spatial resources to the users corresponding to the selected signature vectors.

2. The method according to claim 1, wherein the grouping of signature vectors according to correlations of the signature vectors comprises, according to un-correlation within group rule (UWGR), obtaining grouping results that the correlation of signature vectors within the same group are lower than or equal to a pre-determined threshold.

3. The method according to claim 2, wherein the grouping of signature vectors comprises, creating a group and moving a first un-grouped signature vector to the group;
selecting another un-grouped signature vector and checking the correlations of the selected un-grouped signature vector with all signature vectors in the group;
judging whether all the checked correlations are lower than or equal to the pre-determined threshold and, if yes, moving the selected un-grouped signature vector to the group, otherwise, returning to selecting another un-grouped signature vector and checking the correlations of the selected un-grouped signature vector with all signature vectors in the group until all the remaining un-grouped signature vectors are checked;
returning to creating a group and moving a first un-grouped signature vector to the group until all signature vectors are grouped.

4. The method according to claim 1, wherein the grouping of signature vectors according to correlations of the signature vectors comprises, according to an un-correlation between group rule (UBGR), obtaining grouping results that the correlation of signature vectors between the different groups are lower than or equal to a pre-determined threshold.

5. The method according to claim 1, wherein the assigning spatial resources to the users corresponding to the selected signature vectors comprises: weighting data streams of the users with the selected signature vectors.

6. The method according to claim 2, wherein the selecting signature vectors, assigning the sub-carrier or group of sub-carriers, and assigning spatial resources comprises:
selecting one group;
allocating the same sub-carrier or group of sub-carriers to at least one user whose signature vectors are included in this selected group; and
weighting the data streams of the at least one user by the corresponding signature vector in this group.

7. The method according to claim 4, wherein the selecting signature vectors, assigning the sub-carrier or group of sub-carriers, and assigning spatial resources comprises:
selecting one signature vector in each group;
determining corresponding users according to the selected signature vectors;
allocating the same sub-carrier or group of sub-carriers to the determined users; and
weighting data streams of the determined users by a corresponding spatial signature vector (SSV) in each group.

8. The method according to claim 1, wherein the signature vectors are spatial signature vectors (SSVs).

9. The method according to claim 8, wherein the grouping is performed in real-time.

10. The method according to claim 8, further comprising:
in advance storing a predetermined set of generic SSVs at both the base station and the users;
before the grouping the signature vectors of users at a time period according to correlations of the signature vectors, the method further comprising:
broadcasting control information by the base station;
searching, by one of the users, for the closest generic SSV in the predetermined set of generic SSVs while the user wants to feed back an SSV;
determining, by the user, an index corresponding to the closest generic SSV;
feeding back the index corresponding to the closest generic SSV selected by the user;
wherein the process of grouping signature vectors of the users at a time period according to correlations of the signature vectors further comprises:
at the base station, after receiving SSV indices fed back from the users, searching generic SSVs corresponding to the indices and then grouping the found generic SSVs in real-time; and
after selecting signature vectors having low correlations, the method further comprising:
broadcasting the allocated frequency and time resource, and the SSV indices used to weight data streams.

11. The method according to claim 8, further comprising:
in advance storing predetermined generic SSVs at both the base station and the users,
wherein the grouping the signature vectors of the users at a time period according to correlations of the signature vectors further comprises, in advance grouping the predetermined generic SSVs to obtain generic groups and storing the generic groups in the base station,
between the grouping signature vectors of the users at a time period according to correlations of the signature vectors and the selecting signature vectors having low correlations, the method further comprising, assigning SSVs corresponding to received indices to the generic groups to thereby obtain grouping results.

12. A base station in communication with at least one user in a multi-input, multi-output-orthogonal frequency division multiplex (MIMO-OFDM) system, wherein the base station is configured for a resource allocation method, the method comprising:
receiving, by the base station, signature vectors fed back from users;
for each sub-carrier or group of sub-carriers of the MIMO-OFDM system, grouping the signature vectors of the users at a time period according to correlations of the signature vectors;
from the grouping results, selecting signature vectors having low correlations;
assigning the sub-carrier or group of sub-carriers at a time period to the users corresponding to the selected signature vectors; and
assigning spatial resources to the users corresponding to the selected signature vectors.

13. A time-frequency-space resource allocation scheduler used in a multi-input multi-output-orthogonal frequency-division multiplex (MIMO-OFDM) system, wherein the scheduler is configured for a resource allocation method, the method comprising:
receiving, by the scheduler, signature vectors fed back from users;
for each subcarrier or group of sub-carriers of the MIMO-OFDM system, grouping the signature vectors of the users at a time period according to correlations of the signature vectors;
from the grouping results, selecting signature vectors having low correlations;
assigning the sub-carrier or group of sub-carriers at a time period to the users corresponding to the selected signature vectors; and
assigning spatial resources to the users corresponding to the selected signature vectors.

14. A user equipment in communication with a base station in a for each subcarrier or group of sub-carriers of the MIMO-OFDM system, wherein the user equipment is configured to feed back a signature vector to the base station and the base station is configured for a resource allocation method, the method comprising:
receiving, by the base station, signature vectors fed back from a plurality of user equipments;

for each sub-carrier or group of sub-carriers of the MIMO-OFDM system, grouping signature vectors fed back by the plurality of user equipments at a time period according to correlations of the signature vectors;

from the grouping results, selecting signature vectors having low correlations;

assigning the sub-carrier or group of sub-carriers at a time period to the plurality of user equipments corresponding to the selected signature vectors; and assigning spatial resources to the plurality of user equipments corresponding to the selected signature vectors.

15. A multi-input multi-output-orthogonal frequency-division multiplex (MIMO-OFDM) system, comprising a base station in communication with at least one user equipment, wherein the user equipment is configured to feed back a signature vector to the base station, wherein the base station is configured for a resource allocation method, the method comprising:

receiving, by the base station, signature vectors fed back from a plurality of user equipments;

for each sub-carrier or group of sub-carriers of the MIMO-OFDM system, grouping signature vectors fed back by the plurality of user equipments at a time period according to correlations of the signature vectors;

from the grouping results, selecting signature vectors having low correlations;

assigning the sub-carrier or group of sub-carriers at a time period to the plurality of user equipments corresponding to the selected signature vectors; and assigning spatial resources to the plurality of user equipments corresponding to the selected signature vectors.

\* \* \* \* \*